(No Model.)
M. A. CUTTER.
STREET CAR.
No. 312,556. Patented Feb. 17, 1885.
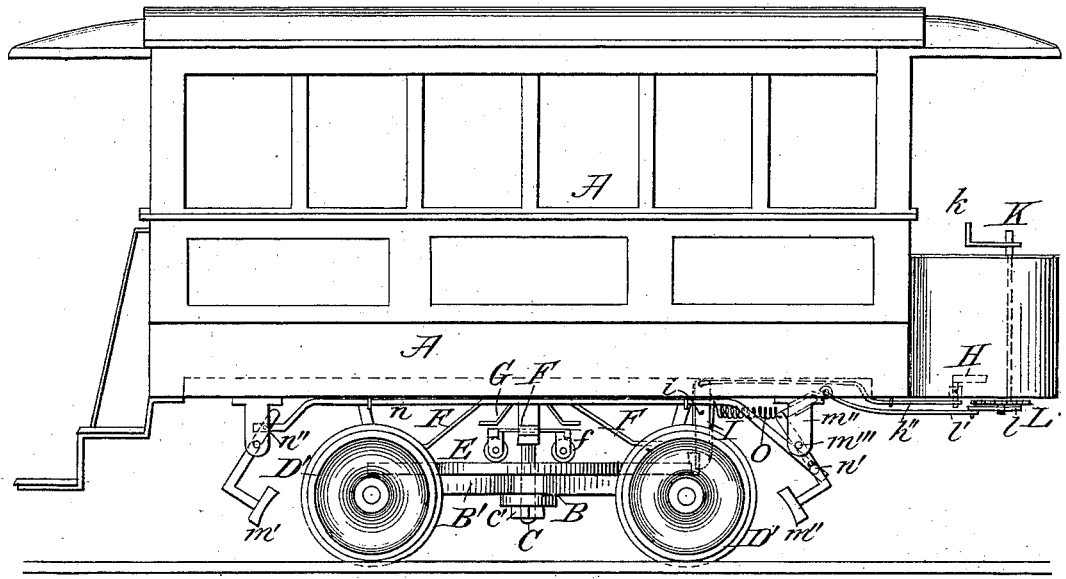
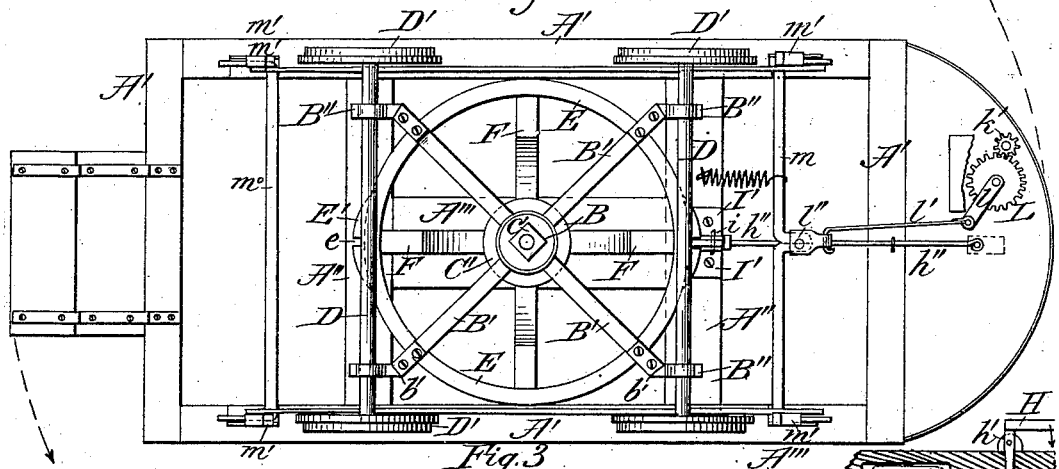
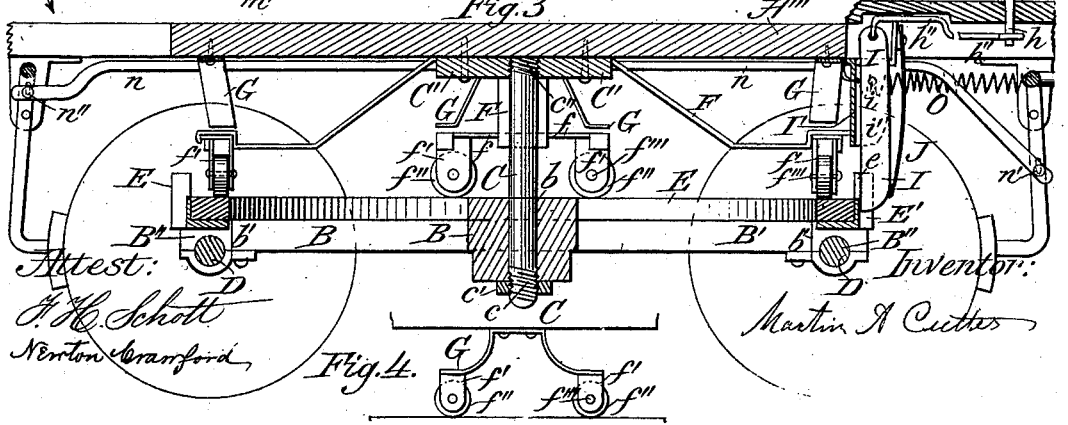

UNITED STATES PATENT OFFICE.

MARTIN A. CUTTER, OF GALVESTON, TEXAS.

STREET-CAR.

SPECIFICATION forming part of Letters Patent No. 312,556, dated February 17, 1885.

Application filed December 23, 1884. (No model.)

*To all whom it may concern:*

Be it known that I, MARTIN A. CUTTER, a citizen of the United States, residing at Galveston, in the county of Galveston and State of Texas, have invented certain new and useful Improvements in Street-Cars, of which the following is a specification, reference being had to the accompanying drawings.

The object of this invention is to improve that kind of street or horse car the body of which is constructed to be reversed in its position upon the truck of the car; and the invention consists in the construction of the car-body, the truck upon which the body rests, the reversing devices comprising the holding and releasing parts, and the combination of the brake devices with a reversible car-body, as will be fully hereinafter described.

In the drawings, Figure 1 represents a side view of the car and its attachments. Fig. 2 represents a view of the bottom of a car, the truck, and operating devices. Fig. 3 represents a longitudinal view, partly in section, of the car-sill and operating parts enlarged; and Fig. 4 represents a modification of certain parts.

A represents the body of a car of any of the common or known ways of construction, except as to the supports of the parts of the operating devices that are necessary for reversing the car-body.

A' A' represent the outside sills of a car, and A'' is a longitudinal and A''' the transverse sills, all secured to the sills A' in such manner as to give support and attachment to the operating parts of the reversing devices of the car-body upon its truck.

B represents a stout metal hub having four radial arms, B', which extend from the hub in diagonal directions to the axis of the car-body, bracing the truck in all directions.

Centrally and perpendicularly through the hub B is a hole, $b$, to receive a stout perpendicular king-bolt, C, which has a screw-thread, $c$, on its lower end to receive screw-nut $c'$ underneath hub B, and a screw-thread, $c''$, on its upper end to screw into a screw-threaded plate, C', that is fast to sill A''' on the bottom of the car-body A. At the outer ends of the radial arms B' and at $b$ the arms angle, so as to produce the bearings B'' to be at right angles to the axles D, upon which the arms B' rest.

$b''$ $b''$ are removable boxes secured to the under side of arms B', and embrace the lower half of axles D, there to secure the axles firmly to arms B', which arms form the truck-frame of the car, and in the ends of which the axles revolve, supporting the truck and the car-body as well.

D' D' are the ordinary flanged wheels, made fast around the axles D, so as to revolve therewith.

E is a circle of metal, either cast upon or made fast to the radial arms B' in a secure way, and its center agreeing with the center of the car-body and the king-bolt C, and forms a circular track upon which the carrying-wheels travel when the body of the car is revolved.

E' E' are catch-blocks on directly opposite sides of the circle E, to which they are permanently secured, each block having a slot, $e$, centrally and perpendicularly on its outer edge, from which slot the blocks curve gently to intersect the perimeter of the said track E, so that a spring-dog will be sure to be forced against a spring and outward until the slot $e$ is coincident with the dog, when the spring forces the dog into the slot and prevents any further revolution of the car-body.

F F are four springs secured to the under side of sill A''', or to the plate C', extending outward and down at their outer ends to grasp and be secured to a horizontal yoke-plate, $f$.

At each end of the yoke-plates $f$ are lugs $f'$, that are secured thereto and bent down, their sides being parallel with each other, so that wheels $f''$ in pairs, placed between the sides of the lugs, with axles $f'''$ for each wheel, will easily revolve upon track E when the car-body is being reversed.

G G are bent or inclined springs made fast to the under side of the sills of the car, and their bent ends to be over the yoke-pieces $f$, that carry the wheels $f''$, so that if uneven surfaces of the track cause the yoke to rise these springs will form an elastic bearing and prevent concussion upon the car-body.

Fig. 4 shows a modification of the springs F, by having the wheels $f''$ and lugs $f'$ attached to the outer ends of bent springs G, which are secured to the sills of the car, the same as the springs G are, without the wheels $f''$.

H is a foot-treadle having an upright shaft, $h$, pivoted at $h'$ to lugs on the upper floor of the driver's platform, thence passing in a wide mortise through the floor, and there to be connected to a horizontally-sliding rod, $h''$, that goes backward to and is at its rear end fast to a pivoted dog, I, which is pivoted at $i$ between lugs $i'$, that project down from angle-plates I', that are fast to the under side of the sill A'' of the car-body.

J is a spring, the upper end of which is secured to the sill A'', is curved outward, and its lower end bearing against the lower end of the pivoted dog I, as seen in Fig. 3, so that the force of the spring while bearing against the dog will keep the inner edge of the dog near to the edge of the circle track E, and as the car-body is rotated, and the slot $e$ becomes coincident with the dog I, the dog will be forced into the slot and hold the car-body from further rotation.

To release the dog from the slot in the catch-block so as to allow the car-body to rotate, the driver puts his foot upon treadle H, forcing it over, and the shaft backward at its lower end, sliding rod $h''$, so that the upper end lifts the dog out of the slot $e$ in the catch-block, when the car-body is free to be rotated.

This construction of devices for locking or unlocking the car-body so as to be rotated only requires the pressure of the foot of the driver upon the treadle to withdraw the dog from the catch-slot as the power to rotate the car-body is applied, when the foot can be removed from the treadle, and the rotation of the car-body is arrested by the dog being forced into the slot $e$ by the spring J without further care of the driver.

K is an ordinary upright brake shaft or stem placed upon the driver's platform and extending down through it, and in such way that it can be secured in its position, and can be easily rotated in proper bearings by the winch or hand-wheel $k$.

$k'$ is a small toothed wheel made fast to the lower end of shaft K, and underneath the platform, and its teeth engaging the teeth of gear-wheel L, that is properly made to rotate on an axis, and having a crank-arm, $l$, secured thereto, which at its outer end is connected to link or rod $l'$, that is attached to a crank-arm, $l''$, of a transverse vibrating shaft, $m$, that extends nearly across the width of the car-body, each end of which shaft is bent down and inward a proper distance, where a brake-shoe, $m'$, is attached.

$m''$ $m''$ are lugs fast to the sills of the car at their upper ends and projecting down a proper distance, so that the bent parts of the shaft $m$ can be pivoted thereto at $m'''$. This construction will, when the brake-shaft is rotated in the right direction, cause the brake-shoes to be forced against the wheels D' and arrest their speed or stop their rotation.

In order to apply the brake-shoes to the wheels simultaneously at opposite sides of the four wheels of a reversible car-body, bent connecting longitudinal rods $n$ $n$, pivoted to the downward bent arms of shaft $m°$ at $n'$ and $n''$ are used, so that as the arms of the shaft $m$ vibrate upon pivots at $m'''$ the rods $n$ will slide longitudinally, and their opposite ends being pivoted to the downward-bent shaft $m°$ (that is, like shaft $m$,) at points $n''$, which is above the pivotal point of the vibrating shaft to its lugs and gives to the shaft a backward movement, which forces the opposite brake-shoes upon the wheels the same as in the first brake movement. When the brakes are to be released from the wheels, the rotation of the brake-shaft is reversed, when spring O, that is fast at one end to a sill of the car and at its opposite end to shaft $m$, and has been, by putting the brakes on, extended, will exert its power to pull shaft $m$ back to its normal position, and the brake-shoes are out of contact with the wheels, as seen in Fig. 1.

I do not claim, broadly, a reversible car-body upon its truck; but

What I do claim, and desire to secure by Letters Patent, is—

1. A car-truck for a reversible car-body, composed of a center hub, B, diagonally-radiating arms B', having axle-bearings at each end, and circle-track E thereon, with the axles D and wheels D', substantially as described.

2. A reversible car-body having springs F, connected at their outer ends with pairs of carrying-wheels $f''$ $f''$, and a center king-bolt, C, in combination with the circle-track E and truck composed of hub B, arms B', axles D, and wheels D', as described.

3. A car-truck frame consisting of the center hub, B, the diagonally-radiating arms B', having bearings at their outer ends in which the wheel-axles revolve, substantially as described.

4. The springs F, connected at their outer ends with pairs of carrying-wheels $f''$, in combination with the keeper-springs G, secured to the under side of the reversible car-body A, substantially as described.

5. A reversible car-body, A, having attached thereto a foot-treadle, H, a spring-holding dog, I, the mechanism to operate the dog, in combination with the circle-track E, having catch-blocks E' thereon with slots $e$ therein, substantially as described.

6. In combination with a reversible car-body, the brake-mechanism consisting, essentially, of the brake-shaft K, gear-wheels $k'$ and L, vibrating pivoted shaft $m$, with arms to which are attached brake-shoes $m'$, and the intermediate devices to operate shaft $m$, substantially as described.

7. In combination with a reversible car-body, the brake mechanism for applying the shown, to the downward-bent arms having brake-shoes to opposite pairs of wheels, consisting of the brake-shaft K and its connection with the vibrating pivoted shaft $m$, the bent and reciprocating rods $n$ $n$, pivoted at one end to the downward-bent arms of shaft $m$, thence extending to shaft $m°$ at the opposite end of the car, and there pivoted, as shown, to the downward-bent arms having brake-shoes at their extremities, substantially as described.

In testimony whereof I affix my signature in presence of two witnesses.

MARTIN A. CUTTER.

Witnesses:
F. H. SCHOTT,
NEWTON CRAWFORD.